United States Patent
Suh et al.

(10) Patent No.: US 9,135,003 B2
(45) Date of Patent: Sep. 15, 2015

(54) RECONFIGURABLE PROCESSOR AND RECONFIGURABLE PROCESSING METHOD OF VECTOR OPERATION USING VECTOR LANE CONFIGURATION INFORMATION

(75) Inventors: Dong-Kwan Suh, Hwaseong-si (KR); Hyeong-Seok Yu, Seoul (KR); Suk-Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 12/987,391

(22) Filed: Jan. 10, 2011

(65) Prior Publication Data

US 2011/0219207 A1 Sep. 8, 2011

(30) Foreign Application Priority Data

Mar. 4, 2010 (KR) ........................ 10-2010-0019325

(51) Int. Cl.
*G06F 9/44* (2006.01)
*G06F 9/22* (2006.01)
*G06F 15/78* (2006.01)
*G06F 15/76* (2006.01)

(52) U.S. Cl.
CPC ...... *G06F 9/22* (2013.01); *G06F 15/76* (2013.01); *G06F 15/7867* (2013.01)

(58) Field of Classification Search
CPC ........ G06F 9/22; G06F 15/76; G06F 15/7867
USPC ................................ 712/13, 15, 20
See application file for complete search history.

(56) References Cited

U.S. PATENT DOCUMENTS

| | | | |
|---|---|---|---|
| 6,366,998 B1* | 4/2002 | Mohamed | 712/17 |
| 6,959,378 B2 | 10/2005 | Nickolls et al. | |
| 2005/0038978 A1 | 2/2005 | Nickolls et al. | |
| 2005/0268075 A1* | 12/2005 | Caprioli et al. | 712/239 |
| 2007/0288930 A1 | 12/2007 | Yim et al. | |
| 2008/0016319 A1* | 1/2008 | Pappalardo et al. | 712/22 |
| 2009/0083519 A1 | 3/2009 | Yang et al. | |
| 2009/0113169 A1* | 4/2009 | Yang et al. | 712/15 |
| 2009/0150647 A1* | 6/2009 | Mejdrich et al. | 712/3 |
| 2010/0049963 A1* | 2/2010 | Bell et al. | 713/100 |

FOREIGN PATENT DOCUMENTS

| | | |
|---|---|---|
| KR | 10-2006-0090512 | 8/2006 |
| KR | 10-2007-0118543 | 12/2007 |
| KR | 10-2009-0027184 | 3/2009 |
| KR | 10-2009-0030498 | 3/2009 |

OTHER PUBLICATIONS

Very Long Instruction Word, Apr. 27, 2009, Wikipedia, pp. 1-6.*

* cited by examiner

*Primary Examiner* — Boris Gorney
*Assistant Examiner* — Jyoti Mehta
(74) *Attorney, Agent, or Firm* — NSIP Law

(57) ABSTRACT

A reconfigurable processor for efficiently performing a vector operation, and a method of controlling the reconfigurable processor are provided. The reconfigurable processor designates at least one of a plurality of processing elements as a vector lane based on vector lane configuration information, and allocates a vector operation to the designated vector lane.

18 Claims, 5 Drawing Sheets

FIG. 4

| | NUMBER OF VECTOR LANES | NUMBER OF PES INCLUDED IN VECTOR LANE | NUMBER OF PES INCLUDING LOAD/STORE UNIT | NUMBER OF PES INCLUDING PARTICULAR FU |
|---|---|---|---|---|
| Application 1 (4000) | 2 | 2 | 1 | 1 |
| Application 2 (4100) | 4 | 2 | 1 | 0 |
| Application 3 (4200) | 2 | 4 | 1 | 0 |
| Application 4 (4300) | 2 | 4 | 2 | 2 |

RECONFIGURABLE PROCESSOR AND RECONFIGURABLE PROCESSING METHOD OF VECTOR OPERATION USING VECTOR LANE CONFIGURATION INFORMATION

CROSS-REFERENCE TO RELATED APPLICATION(S)

This application claims the benefit under 35 U.S.C. §119 (a) of Korean Patent Application No. 10-2010-0019325, filed on Mar. 4, 2010, in the Korean Intellectual Property Office, the entire disclosure of which is incorporated herein by reference for all purposes.

BACKGROUND

1. Field

The following description relates to a technique for calculating vector data for a reconfigurable processor including a vector lane.

2. Description of the Related Art

Reconfigurable architecture refers to architecture in which the hardware configuration of a computing device may be changed to optimally perform a task.

When a task is processed only in a hardware manner, it is difficult to efficiently carry out the task once changes occur in the process of the task because of the fixed configuration of the hardware. In contrast, if a task is processed only in a software manner, the task can be processed by reconfiguring the software and changes that occur in the process of a task may be dealt with, but the processing speed is slower than when the data is processed in a hardware manner.

The reconfigurable architecture processes tasks based on both hardware and software advantages. Recently, research has been conducted to develop a reconfigurable architecture for effectively performing a vector operation that executes the same task iteratively.

SUMMARY

In one general aspect, there is provided a reconfigurable processor comprising a plurality of processing elements (PEs), a designation unit configured to designate at least one of the PEs as a vector lane based on vector lane configuration information, and an allocation unit configured to allocate a vector operation to the designated vector lane.

The vector lane configuration information may include a type of application that is set to be processed, and the designation unit may designate the at least one PE as a vector lane based on the determined type of application to be processed.

The designation unit may designate the vector lane such that a designated PE includes a designated function unit (FU) or a load/store unit for reading and/or writing vector data.

The designated FU may perform at least one of a multiplication operation, a division operation, and a floating-point operation.

The designation unit may be configured to designate a plurality of vector lanes that have the same configuration.

The vector lane configuration information may include the number of vector lanes, the number of PEs included in each vector lane, the number of PEs included in the vector lane and which also include a load/store unit, the number of PEs included in the vector lane and which also include a function unit, and connection status between the PEs.

The reconfigurable processor may further comprise a vector register file configured to store vector data or a vector operation, wherein the allocation unit is configured to read the vector data or the vector operation from the vector register file and/or to write operated vector data in the vector register file.

The number of vector register files may be the same as the number of designated vector lanes, and the vector register files may be connected with the designated vector lanes, respectively.

In another aspect, there is provided a method of controlling a reconfigurable processor, the method comprising designating at least one of a plurality of processing elements (PEs) as a vector lane based on vector lane configuration information, and allocating a vector operation to the designated vector lane.

The designating of the PE as the vector lane may include determining a type of an application that is set to be processed, and designating the vector lane based on the determined type of application.

The designating of the PE as the vector lane may include reading vector lane configuration information from a vector lane configuration memory.

The designating of the PE as the vector lane may include designating the vector lane such that a PE includes a designated function unit (FU) or a load/store unit for reading and/or writing vector data.

The designated FU may perform at least one of a multiplication operation, a division operation, and a floating-point operation.

The vector lane configuration information may include the number of vector lanes, the number of PEs included in each vector lane, the number of PEs included in the vector lane and which also include a load/store unit, the number of PEs included in the vector lane and which also include a function unit, and connection status between the PEs.

In another aspect, there is provided a reconfigurable processor comprising a reconfigurable array of processing elements for processing operations using one or more vector lanes, and a control unit to read vector lane configuration information from a memory, to designate at least one vector lane including at least one processing element, and to allocate a respective operation to each of the at least one vector lanes.

The control unit may designate a plurality of vector lanes that each include at least one processing element, each vector lane may be allocated an operation, and the plurality of vector lanes may perform the allocated operations in parallel.

Each vector lane may repeatedly perform the allocated operation.

The control unit may designate a first configuration of vector lanes for processing a first type of application, and in response to determining that a second type of operation is set to be processed, the control unit may change the connection status between one or more of the processing elements in order to designate a second configuration of vector lanes for processing the second type of application.

The changing of the connection status may include changing at least one of the amount of processing elements included in each vector lane and changing the order in which each processing element processes data.

The reconfigurable processor may include a coarse-grained array mode to process operations as a coarse-grained array processor, a very long instruction word mode (VLIW) to process operations as a VLIW processor, and a vector operation mode to process operations as a vector lane processor, and mode switching is performed by the control unit.

Other features and aspects may be apparent from the following description, the drawings, and the claims.

BRIEF DESCRIPTION OF THE DRAWINGS

FIG. 4 is a table showing an example of vector lane configuration information for various applications.

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
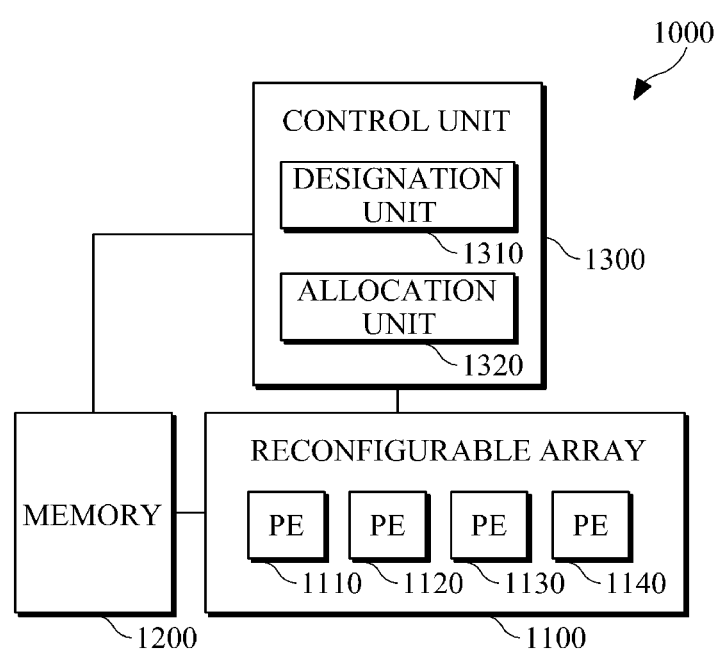
FIG. 1 is a diagram illustrating an example of a reconfigurable processor.

FIG. 1 illustrates an example of a reconfigurable processor.

Referring to FIG. 1, reconfigurable processor 1000 includes a reconfigurable array 1100, a memory 1200, and a control unit 1300.

For example, the reconfigurable array 1100 may include a plurality of processing elements (PEs) such as PEs 1110, 1120, 1130, and 1140. Each of the PEs 1110, 1120, 1130, and 1140 may be capable of processing an instruction or data in parallel. In this example, the reconfigurable array includes four processing elements, but the processor is not limited thereto. For example, the reconfigurable processor may include two PEs, three PEs, four PEs, 10 PEs, or more.

The connections between the PEs 1110, 1120, 1130, and 1140 and the operation order of the PEs 1110, 1120, 1130, and 1140 may be changed based on a task that is to be processed. For example, the connection statuses and/or the operation order of the PEs 1110, 1120, 1130, and 1140 may be changed by the control unit 1300 in such a manner as to efficiently process a vector operation. Examples of changing the connection statuses and operation order of the PEs are further described with reference to FIGS. 2 and 3.

The vector operation refers to an operation such as a matrix operation that executes the same operation of data iteratively. The vector operation may have no dependency on other operations or functions. In addition, the vector operation refers to a procedure of processing a vector operation with the PEs.

A processing element (PE) may consist of at least one of a function unit (FU) and a load/store unit. For example, the load/store unit may store and/or write vector data in the memory 1200. The FU may perform an operation on vector data stored in an application. In some embodiments, a PE may further include a register file.

The FU may perform simple operations such as addition, subtraction, an AND operation, an OR operation, and the like. In some embodiments, the FU may perform more complex operations such as multiplication, division, a floating-point operation, and the like. For example, the PEs may include FUs that perform only a simple operation. Alternatively, the PEs may include FUs that can perform both simple and complex operations.

Additionally, each of the PEs may be capable of processing a task in parallel. For example, the PEs may perform a data level parallelism (DLP) process.

The memory 1200 may store data used for a vector operation. For example, the memory 1200 may store vector data that is to be processed. As another example, the memory 1200 may temporarily store processing results, or store processed vector data. As yet another example, the memory 1200 may store vector lane configuration information, information used for driving the reconfigurable processor 1000, connection status information of the reconfigurable array, information about a method of operating the reconfigurable array, and the like.

In this example, the vector lane refers to one or more PEs dedicated to the vector operation. For example, the vector lane configuration information may include the total number of vector lanes, the number of PEs included in each vector lane, the number of PEs included in the vector lane and which also include a load/store unit, the number of PEs included in the vector lane and which also include an FU, connection status between the PEs, and the like. In this example, the FU may perform a complex operation such as multiplication, division, and a floating-point operation.

As an example, the reconfigurable processor 1000 may include coarse-grained array (CGA) mode, very long instruction word (VLIW) mode, and/or a vector mode. For example, the reconfigurable processor 1000 may process a loop operation in CGA mode, a general operation in VLIW mode, and a vector operation in vector mode. Mode switching may be performed by the control unit 1300.

The control unit 1300 includes a designation unit 1310 and an allocation unit 1320. In response to performing in the vector operation mode, the designation unit 1310 may read vector lane configuration information from the memory 1200. The designation unit 1310 may designate one or more PEs from among the plurality of PEs included in the reconfigurable array, as a vector lane. The vector lane may be designated based on vector lane configuration information. For example, the designation unit 1310 may change the connection status of one or more PEs based on connection status information between the PEs included in the vector lane connection status information.

As another example, the designation unit 1310 may designate one or more PEs as a vector lane based on the vector lane configuration information that includes the type of an application to be processed. That is, the designation unit 1310 may determine the type of application to be processed, and designate the vector lane using vector lane configuration information based on the determined type of the application. An example of designating a vector lane based on the type of application to be processed is further described with reference to FIG. 4.

The designation unit 1310 may designate at least one or more vector lanes. For example, the designation unit 1310 may designate the vector lanes to have the same configuration or different configurations.

The allocation unit 1320 allocates a vector operation to the designated vector lane. Accordingly, the vector lane performs an operation (vector operation) on the allocated vector data. For example, each of the vector lanes may process the vector data in parallel. The processing result may be stored in the memory 1200. The allocation unit 1320 may read out vector data or a vector operation from the memory 1200 and/or write vector data in to the memory 1200.

The reconfigurable processor may configure different types of vector lanes based on the vector lane configuration information, in order to perform a vector operation more efficiently.

For example, the reconfigurable processor may configure the vector lane based on the type of application to be processed, to thereby effectively perform an operation on vector data included in various types of applications.

Figure 2:
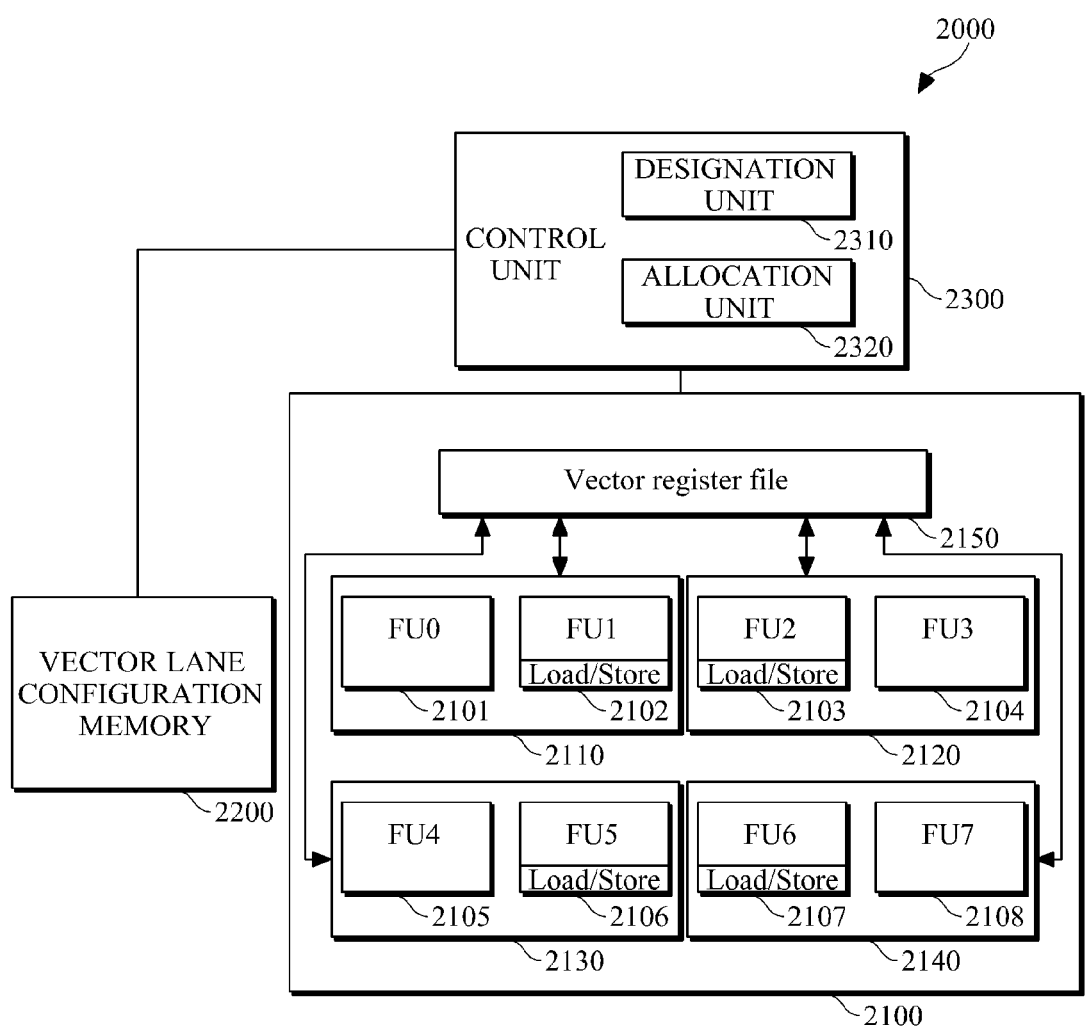
FIG. 2 is a diagram illustrating a second example of a reconfigurable processor.

FIG. 2 illustrates a second example of a reconfigurable processor.

Referring to FIG. 2, reconfigurable processor 2000 includes a reconfigurable array 2100, a vector lane configuration memory 2200, and a control unit 2300.

For example, the reconfigurable array 2100 may include a plurality of PEs 2101, 2102, 2103, 2104, 2105, 2106, 2107, and 2108, and a vector register file 2150. In this example, each of the PEs 2101, 2102, 2103, 2104, 2105, 2106, 2107, and 2108 may include only an FU or both the FU and a load/store unit. In some embodiments, the PEs may include a register.

The vector register file 2150 may store data used for one or more vector operations. In this example, the vector register file 2150 is included in the reconfigurable array 2100 as illustrated in FIG. 2, however, it should be appreciated that the vector register file 2150 may be placed at a different location. The number of vector register files 2150 may be equal to the total number of the PEs that are designated as vector lanes, and a plurality of vector register files 2150 may be respectively connected with the PEs. As an example, each register file may be connected to a corresponding vector lane such that each vector lane is connected to a separate register file.

The vector lane configuration memory 2200 may store vector lane configuration information. For example, the vector lane configuration information may include the number of vector lanes, the number of PEs included in each respective vector lane, the number of PEs including a load/store unit for reading and writing vector data, the number of PEs that are included in the vector lane and which include an FU, the connection statuses between PEs, and the like.

In this example, the vector lane configuration information indicates that the number of vector lanes is 4, two PEs are included in each vector lane, and one of the PEs included in each respective vector lane includes a load/store unit.

When vector operation mode is activated, the designation unit 2310 of the control unit 2300 may read the vector lane configuration information stored in the vector lane configuration memory 220. The designation unit 2310 may designate one or more vector lanes, for example, four vector lanes 2110, 2120, 2130, and 2140 based on the vector lane configuration information.

In this example, the first vector lane 2110 includes two PEs 2101 and 2102, and the PE 2102 includes a load/store unit. The second vector lane 2120 includes two PEs 2103 and 2104, and the PE 2103 includes a load/store unit. The third vector lane 2130 includes two PEs 2105 and 2106, and the PE 2106 includes a load/store unit. The fourth vector lane 2140 includes two PEs 2107 and 2108, and the PE 2107 includes a load/store unit.

The vector register file 2150 may include a plurality of register files, for example, eight vector register files, and the respective vector register files 2150 may be connected with the PEs 2101, 2102, 2103, 2104, 2105, 2106, 2107, and 2108. The designation unit 2310 may designate the vector lanes 2110, 2120, 2130, and 2140 to have the same configuration.

As an example, the designation unit 2310 may change the connection status between the processing elements based on connection status information included in the vector lane and/or the connection status information between the vector lane and the vector register file 2150.

The allocation unit 2320 may allocate a vector operation to each vector lanes 2110, 2120, 2130, and 2140 in order to process the vector operations. For example, each vector lane 2110, 2120, 2130, and 2140 may process the respective allocated vector data in parallel. The vector lanes receive the vector data, respectively, from the vector register files. Accordingly, the vector lanes may store the operation result in the vector register files, respectively.

The reconfigurable processor may configure various forms of vector lanes based on the vector lane configuration information, to more efficiently process a vector operation.

Figure 3:
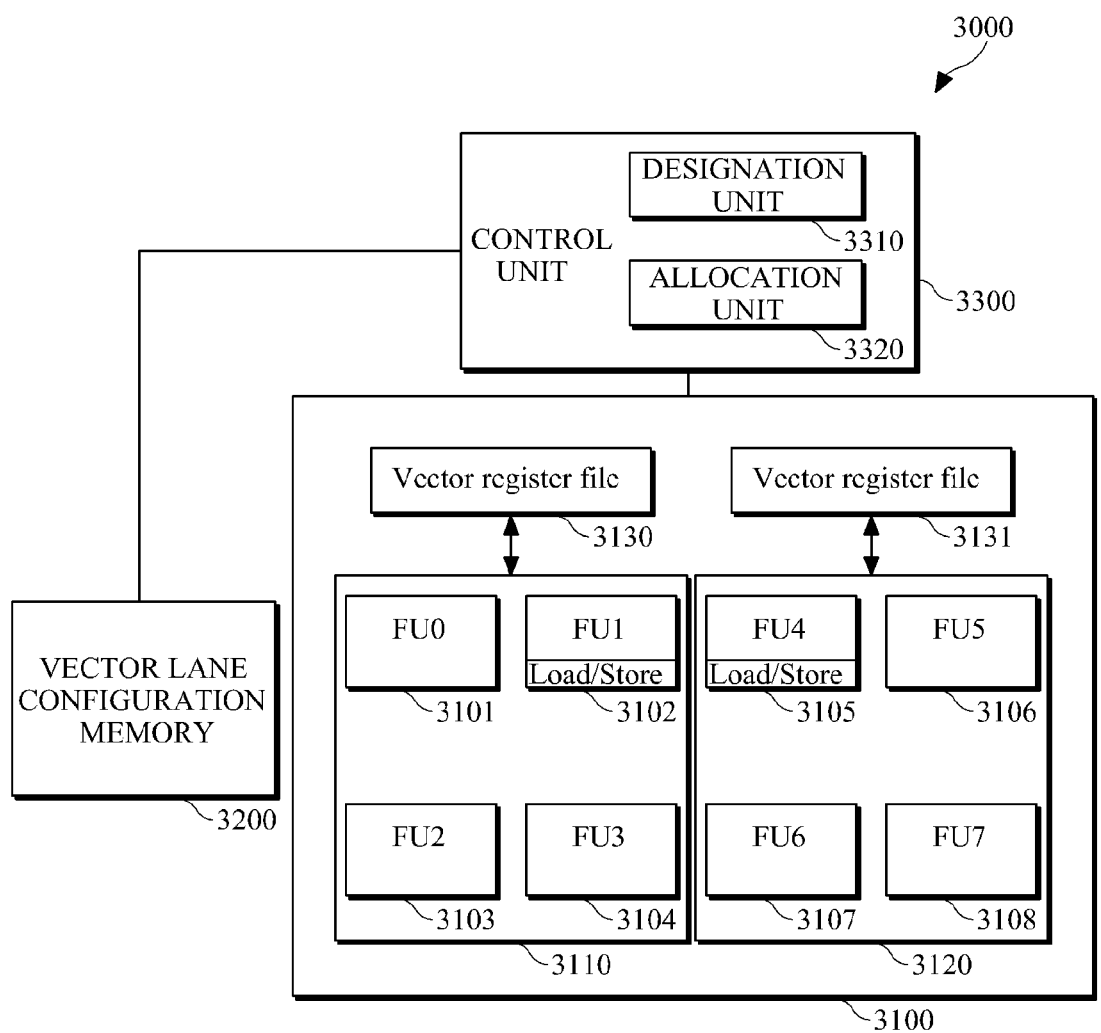
FIG. 3 is a diagram illustrating a third example of a reconfigurable processor.

FIG. 3 illustrates a third example of a reconfigurable processor. Referring to FIG. 3, the reconfigurable processor 3000 includes a reconfigurable array 3100, a vector lane configuration memory 3200, and a control unit 3300.

For example, the reconfigurable array 3100 may include a plurality of PEs 3101, 3102, 3103, 3104, 3105, 3106 3107, and 3108, and vector register files 3130 and 3131. The respective vector register files 3130 and 3131 may store data used for a vector operation.

The vector lane configuration memory 3200 may store vector lane configuration information. For example, the vector lane configuration information may indicate that the number of vector lanes is two, each vector lane includes four PEs, and one of the PEs included in the vector lane includes a load/store unit.

When vector operation mode is activated, the designation unit 3310 of the control unit 3300 may read the vector lane configuration information stored in the vector lane configuration memory 3200. Accordingly, based on the stored vector lane configuration information, the designation unit 3310 may designate one or more vector lanes, for example, two vector lanes 3110 and 3120.

In this example, the first vector lane 3110 includes four PEs 3101, 3102, 3103, and 3104, and the PE 3102 includes a load/store unit. The second vector lane 3120 includes four PEs 3105, 3106, 3107, and 3108, and the PE 3105 includes a load/store unit.

For example, the first vector lane 3110 is connected with a first vector register file 3130 and the second vector lane 3120 may be connected with a second vector register file 3131. For example, the four PEs 3101, 3102, 3103, and 3104 included in the first vector lane 3110 may be connected with the first vector register file 3130, and the four PEs 3105, 3106, 3107, and 3108 included in the second vector lane 3120 may be connected with the second register file 3131.

The allocation unit 3320 may allocate a vector operation to be processed to the respective vector lanes 3110 and 3120. For example, each of the vector lanes 3110 and 3120 may process allocated vector data in parallel.

The reconfigurable processor may designate various forms of vector lanes based on the vector lane configuration information in order to more efficiently process a vector operation.

FIG. 4 illustrates an example of a table including vector lane configuration information.

Referring to the example shown in FIG. 4, the vector lane configuration information for a first application 4000 indicates that the number of vector lanes is two, each vector lane includes two PEs, one of the PEs included in the vector lane includes a load/store unit, and one of the PEs included in the vector lane includes a particular FU that is capable of performing a complex operation, for example, multiplication, division, a floating-point operation, and the like.

For example, the configurable processor may process the first application more efficiently when two vector lanes are configured and each vector lane includes two PEs, one of the PEs includes a load/store unit, and the other PE includes a particular FU.

The vector lane configuration information for a second application 4100 indicates that the number of vector lanes is four, each vector lane includes two PEs, one of the PEs included in the vector lane includes a load/store unit, and none of the PEs included in the vector lane includes a particular FU.

The vector lane configuration information for a third application 4200 indicates that the number of vector lanes is two, each vector lane includes four PEs, one of the PEs included in the vector lane includes a load/store unit, and none of the PEs included in the vector lane includes a particular FU.

The vector lane configuration information for a fourth application 4300 indicates that the number of vector lanes is two, each vector lane includes four PEs, two of the PEs included in the vector lane include a load/store unit, and two of the PEs included in the vector lane include a particular FU.

For example, if the second application 4100 is set to be processed, the designation unit of the control unit may designate vector lanes based on the vector lane configuration information that corresponds to the second application 4100. For example, the designated vector lanes may be the same as those illustrated in the example of FIG. 2.

As another example, if the third application 4200 is set to be processed, the designation unit of the control unit may designate vector lanes based on the vector lane configuration information that corresponds to the third application 4200. For example, the designated vector lanes may be the same as those illustrated in the example of FIG. 3.

As yet another example, if the fourth application 4300 is set to be processed, the designation unit of the control unit may designate vector lanes based on the vector lane configuration information that corresponds to the fourth application 4300. For example, four PEs may be included in each vector lane, two of the PEs included in the vector lane include a load/store unit, and two of the PEs included in the vector lane include a particular FU (not shown).

The reconfigurable processor may configure one or more vector lanes based on a type of an application to be processed, to more efficiently process an operation on vector data included in various types of applications.

Figure 5:
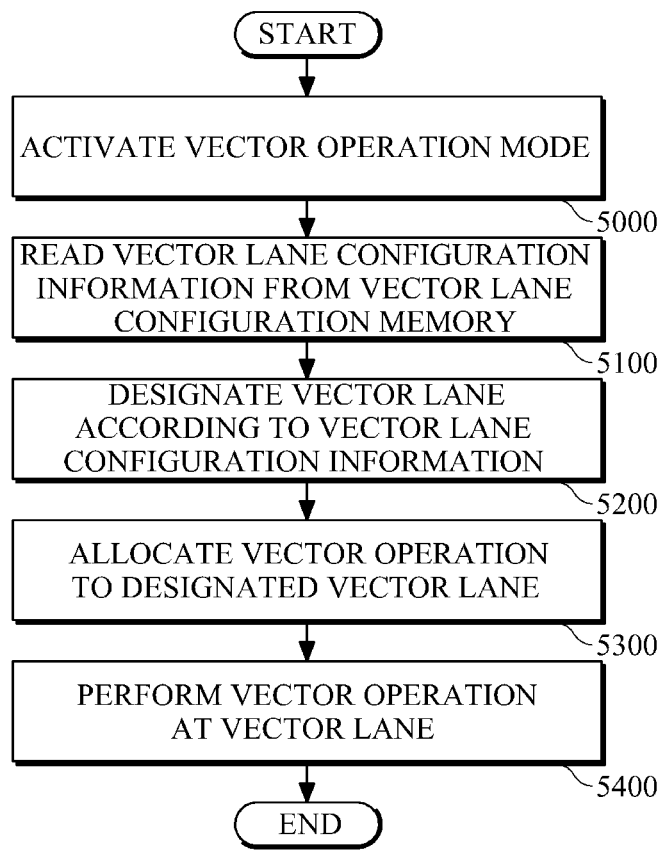
FIG. 5 is a flowchart illustrating an example of a method of controlling a reconfigurable processor.

FIG. 5 illustrates a method of controlling a reconfigurable processor.

Referring to FIG. 5, when vector operation mode is activated in 5000, a designation unit of a control unit reads vector lane configuration information from a vector lane configuration memory in 5100. In 5200, the designation unit designates one or more PEs from among a plurality of PEs as a vector lane based on the vector lane configuration information read from the memory. For example, the designation unit may change connection status information between the elements based on connection status information between PEs included in the vector lane and/or the connection status information between the vector lane and a register file. An allocation unit allocates a vector operation to be processed to the designated vector lane, in 5300. In 5400, the vector lanes perform the operations on allocated vector data. For example, the vector lanes may process the vector data in parallel.

As another example, the designation unit may determine a type of an application to be processed. Accordingly, the designation unit may designate a vector lane based on the determined application type.

The above method of controlling the reconfigurable processor may configure various forms of vector lanes based on vector lane configuration information, thereby efficiently performing a vector operation.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor comprising:
a plurality of processing elements (PEs);
a memory configured to store instructions, wherein when executed by a processor, said instructions implement:
a designation unit configured to designate at least one of the PEs as a vector lane, based on vector lane configuration information, and
an allocation unit configured to allocate a vector operation to the designated vector lane;
wherein the vector lane configuration information includes: a number of vector lanes, a number of PEs included in each of the vector lanes, a number of PEs included in each of the vector lanes and that also include a particular function unit, a number of PEs included in each of the vector lanes and that also include a load/store unit, and a connection status between the PEs in a vector lane.

2. The reconfigurable processor of claim 1, wherein the vector lane configuration information includes: a type of application that is set to be processed, and wherein the designation unit is configured to designate the vector lane, based on the determined type of application to be processed.

3. The reconfigurable processor of claim 1, wherein the designation unit is configured to designate the vector lane, such that a designated PE includes: a designated function unit (FU) or a load/store unit for at least one of reading and writing vector data.

4. The reconfigurable processor of claim 3, wherein the designated FU is configured to perform at least one of: a multiplication operation, a division operation, and a floating-point operation.

5. The reconfigurable processor of claim 1, wherein the designation unit is configured to designate a plurality of vector lanes that have the same configuration.

6. The reconfigurable processor of claim 1, further comprising:
a vector register file configured to store vector data for a vector operation, wherein the allocation unit is configured to perform at least one of: read the vector data or the vector operation from the vector register file, and write operated vector data in the vector register file.

7. The reconfigurable processor of claim 6, wherein the number of vector register files is the same as the number of designated vector lanes, and wherein the vector register files are connected with the designated vector lanes, respectively.

8. A method of controlling a reconfigurable processor, the method comprising:
designating at least one of a plurality of processing elements (PEs) as a vector lane, based on vector lane configuration information; and
allocating a vector operation to the designated vector lane, wherein the vector lane configuration information includes: a number of vector lanes, a number of PEs included in each of the vector lanes, a number of PEs included in each of the vector lanes and that also include a particular function unit, a number of PEs included in each of the vector lanes and that also include a load/store unit, and a connection status between the PEs in a vector lane.

9. The method of claim 8, wherein the designating of the vector lane includes:
determining a type of an application that is set to be processed; and
designating the vector lane, based on the determined type of application.

10. The method of claim 8, wherein the designating of the vector lane includes reading the vector lane configuration information from a vector lane configuration memory.

11. The method of claim 8, wherein the designating of the vector lane includes designating the vector lane, such that a PE includes: a designated function unit (FU) or a load/store unit for at least one of reading and writing vector data.

12. The method of claim 11, wherein the designated FU performs at least one of a multiplication operation, a division operation, and a floating-point operation.

13. A reconfigurable processor comprising:
a reconfigurable array of processing elements configured to process operations using one or more vector lanes; and
a memory configured to store instructions, wherein when executed by a processor, said instructions implement:
a control unit configured to read vector lane configuration information from a memory, to designate a vector lane including at least one processing element, based on the vector lane configuration information, and to allocate a respective operation to the vector lane;
wherein the vector lane configuration information includes: a number of vector lanes, a number of PEs included in each of the vector lanes, a number of PEs included in each of the vector lanes and that also include a particular function unit, a number of PEs included in each of the vector lanes and that also include a load/store unit, and a connection status between the PEs in a vector lane.

14. The reconfigurable processor of claim 13, wherein the control unit is configured to designate a plurality of vector lanes that each include at least one processing element, each vector lane is allocated an operation, and the plurality of vector lanes perform the allocated operations in parallel.

15. The reconfigurable processor of claim 14, wherein each vector lane is configured to repeatedly perform the allocated operation.

16. The reconfigurable processor of claim 13, wherein the control unit is configured to designate a first configuration of vector lanes to process a first type of application, and in response to determining that a second type of application is set to be processed, the control unit is configured to change the connection status between one or more of the processing elements in order to designate a second configuration of vector lanes for processing the second type of application.

17. The reconfigurable processor of claim 16, wherein the changing of the connection status includes at least one of: changing a quantity of processing elements included in each vector lane, and changing an order in which each processing element processes data.

18. The reconfigurable processor of claim 13, wherein the reconfigurable processor includes: a coarse-grained array mode to process operations as a coarse-grained array processor, a very long instruction word mode (VLIW) to process operations as a VLIW processor, and a vector operation mode to process operations as a vector lane processor, and mode switching is performed by the control unit.

\* \* \* \* \*